United States Patent [19]

Schaffer

[11] 4,280,483
[45] Jul. 28, 1981

[54] SOLAR HEATER

[76] Inventor: I. Lawrence Schaffer, 134 Covina Ave., Long Beach, Calif. 90803

[21] Appl. No.: 186,341

[22] Filed: Sep. 11, 1980

[51] Int. Cl.³ .............................................. F24J 3/02
[52] U.S. Cl. ............................... 126/433; 165/104.14; 165/104.17; 165/104.21; 126/436
[58] Field of Search ........................ 126/433; 165/105

[56] References Cited
U.S. PATENT DOCUMENTS

| 4,073,284 | 2/1978 | Laing | 126/433 |
| 4,240,405 | 12/1980 | French | 126/433 |

Primary Examiner—Carroll B. Dority, Jr.
Attorney, Agent, or Firm—Fulwider, Patton, Rieber, Lee & Utecht

[57] ABSTRACT

A solar heater adapted to be made as an integral, sealed unit for installation in a building exterior wall or for use in an existing window opening or the like. A collector is operative to transfer solar heat to an adjacent evaporator to heat and vaporize a liquid refrigerant. The refrigerant vapor rises naturally into a condenser disposed in intimate contact with a solid phase change material carried in a plurality of spaced containers. The refrigerant is condensed and flows by gravity back to the evaporator, giving up its heat of vaporization to the phase change material, resulting in melting of a portion of the material, and thereby storing heat. Air circulating past the containers receives heat from the material for heating the building interior during the night as well as the day. Stackable, nestable units are disclosed.

10 Claims, 6 Drawing Figures

SOLAR HEATER

BACKGROUND OF THE INVENTION

1. Field of the Invention

The present invention relates to solar heaters, and particularly to solar heaters of the type utilizing a vaporizable refrigerant to effect heat transfer to a heat storage means.

2. Description of the Prior Art

Conventional solar heating systems can be broadly categorized as either passive or active. A passive system is effective to collect heat during the day to heat the building interior, but during the night an unacceptable heat loss occurs unless the collector air space is manually or automatically covered with insulation during the night. This introduces an undesired system complexity. In addition, the enclosed air spaces in a typical passive system become uncomfortably hot during the day in order to store enough heat for significant heating at night.

Active heating systems require circulation of fluids such as air, water, ethylene glycol and the like, through the collector portion of the system during the day. This makes the system complex and expensive since recirculation pumps or fans are required. In addition, associated controls are required to halt such fluid circulation at night. The added components and moving parts in such a system typically result in a much shorter service life compared to passive heating systems.

An interesting variation on the foregoing systems is an apparatus disclosed in U.S. Pat. No. 4,073,284, issued Feb. 14, 1978, and entitled "Process and Device for Utilizing Meteorlogical Radiations". This system uses a heat storage material to store energy in the form of latent heat rather than sensible heat, thereby tending to avoid some of the problems of passive systems. A heat storage material is used whose temperature of crystallization coincides with the desired process temperature. Heat is stored in the material by changing its phase from solid to liquid at a predetermined process temperature. However, the system utilizes wicking to effect movement of refrigerant in opposition to the force of gravity, and this results in a relatively complex structure. An important consideration in a suitable solar heater is simplicity of construction to reduce initial cost and prolong service life.

SUMMARY OF THE INVENTION

The present invention comprises a solar heater characterized by a collector and evaporator means for utilizing solar heat to vaporize a liquid refrigerant. The heater includes a condensor located above the evaporator and disposed through a plurality of heat storage containers containing a phase change material. The refrigerant is liquified upon giving up its heat to the phase change material and flows by gravity back to the evaporator for recirculation. The phase change material is selected to liquify at a predetermined working temperature upon accepting heat from the refrigerant, and the latent heat thereby stored is given up to air circulated past the containers only if the air is at a temperature below the predetermined working temperature. Thus, heating of interior air is effected during the night as well as the day.

It is important that the condensor be located above the evaporator so that the vaporized refrigerant will rise naturally into the condensor, and so that the condensed refrigerant will flow downwardly into the evaporator under the influence of gravity. When the evaporator is no longer receiving solar heat, the liquid refrigerant collecting in the evaporator prevents further circulation of refrigerant, thereby preventing an unwanted withdrawal of heat from the phase change material and escape to the outside through the evaporator and collector.

The present solar heater is typically self-contained and hermetically sealed for easy and rapid installation into new construction or into an existing window opening, for example. In one embodiment the heater configuration permits a plurality of heaters to be stacked in superposed relation in a vertically elongated opening in a building wall.

No pumps or fans are required for circulation of air or refrigerant. However, if desired, particularly where stacked units are involved, a fan can be utilized to facilitate air circulation past the heat storage containers.

Other objects and features of the invention will become apparent from consideration of the following description taken in connection with the accompanying drawings.

DESCRIPTION OF THE PREFERRED EMBODIMENT

Figure 1:
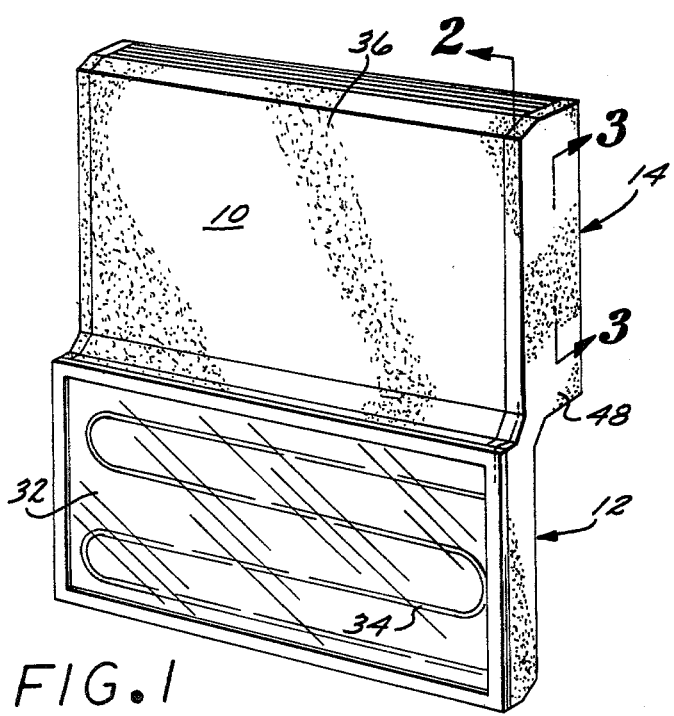
FIG. 1 is a perspective view of a solar heater according to the present invention.

Referring now to the drawings, there is illustrated a solar heater 10 according to the present invention. As will be seen, the heater 10 is described in connection with the heating of a building interior, such as a house interior. In one embodiment, the heater is configured for removable installation within a window opening.

The heater 10 is an integral, self-contained unit which collects and stores solar heat during the day to heat the air in a home during the night, and without any need for electrical power or manipulation or adjustment of the heater by the homeowner.

Solar heater 10 comprises, generally, a rectangularly configured collector and evaporator means 12 and as inwardly offset condensor and storage means 14 located above the means 12.

Figure 6:
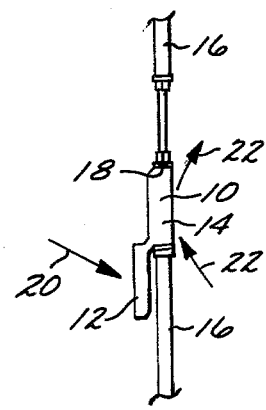
FIG. 6 is a diagrammatic side elevational view of a single solar heater mounted within a window opening.

As seen in FIG. 6, the heater 10 is adapted to be mounted in an exterior wall 16 or window opening 18 of a south facing building wall so that the collector and evaporator means 12 is exposed to the sun's rays, as indicated at 20, while the condensor and storage means 14 are exposed to air circulating within the home, as indicated at 22.

The collector and evaporator means 12 includes a collector 24 characterized by strong absorption of sunlight with low emissivity in the infrared region and low convective losses. Preferably the collector 24 includes a heat conductive absorber sheet 26 having a black outer surface for maximum heat absorption. The sheet 26 is mounted in a cavity provided in a rectangular block 30 made of suitable heat insulating material. The cavity 28 is covered by a sheet 32 of material such as glass which is transparent to the sun's rays, but which is substantially opaque to long wave radiation. As is well known, the result of this arrangement is to develop or collect heat in the collector cavity 28.

An evaporator 34 of serpentine tubular construction is brazed or otherwise attached to the absorber sheet 26 for good heat transfer, and its horizontally oriented runs are slightly inclined so that any liquid refrigerant in such runs tends to flow downwardly under the influence of gravity. The tubes of the evaporator 34 generally lie in a vertical plane, although the plane of the evaporator tubes may be sloped away from the sun, if desired, to achieve improved solar energy collection. As alternatives to the serpentine series tubing arrangement shown, the evaporator may employ parallel flow paths or a series/parallel combination thereof.

The refrigerant is preferably a low vapor pressure substance such as "Freon 11" or "Freon 113", manufactured by the DuPont Company. Such a refrigerant vaporizes in the evaporator 34 as the temperature in the cavity 28 mounts during sunny, daylight conditions.

Figure 2:
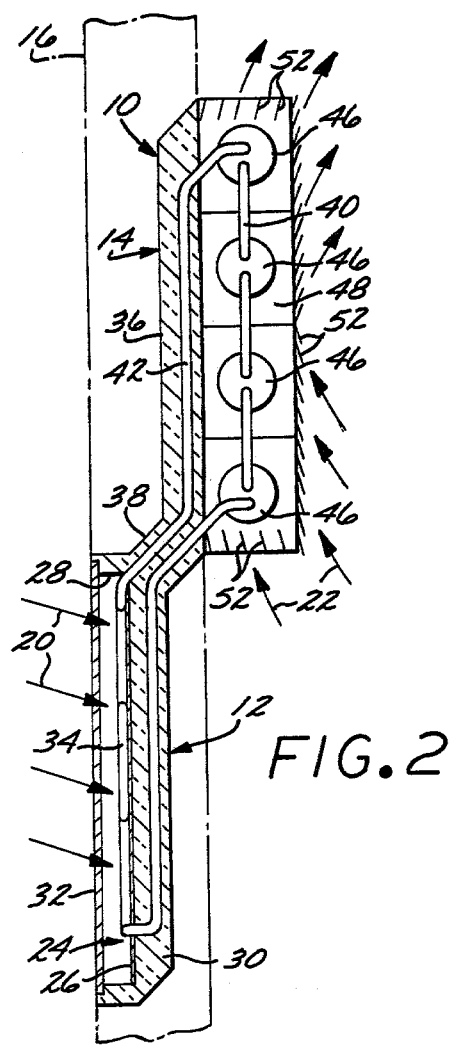
FIG. 2 is an enlarged view taken along the line 2—2 of FIG. 1.

The condensor and storage means 14 comprises a block 36 made of heat insulating material which is inwardly offset relative to the lower block 30, being connected to the block 30 by an integral upwardly and inwardly inclined intermediate block 38, as best seen in FIG. 2.

Figure 4:
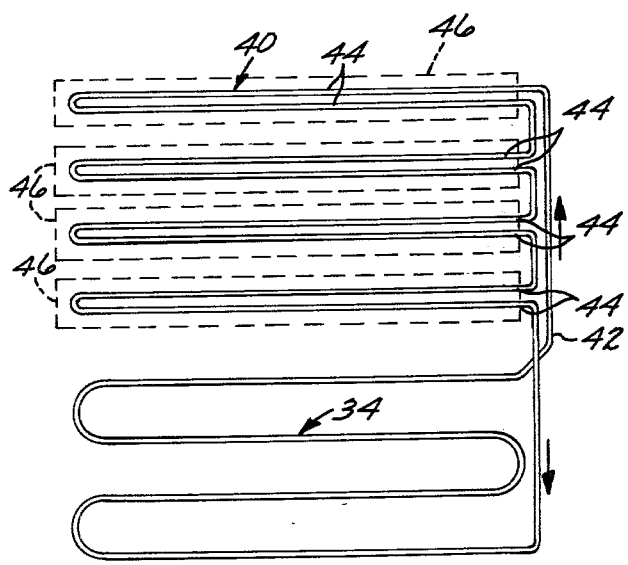
FIG. 4 is a generally diagrammatic view of the interconnected evaporator and condensor, illustrating the direction of refrigerant flow.

The means 14 includes a tubular condensor 40 whose serpentine series connected runs are fluid coupled to the evaporator 34 by a vertical run 42, as best seen in FIG. 4. The run 42 is connected to the upper run of the upper pair of a plurality of pairs of horizontal runs 44. Each pair of runs extends into and out of a cylindrical, horizontally elongated heat storage container 46, and all of the pairs of horizontal runs 44 are interconnected as illustrated in FIG. 4, and all generally lie in a vertical plane inwardly offset relative to the vertical plane within which the evaporator tubes lie. The horizontally oriented condensor runs 44 are sloped slightly to facilitate gravity drainage of liquid refrigerant. As alternatives to the serpentine series tubing arrangement shown, the condensor may employ parallel flow paths or a series/parallel combination, thereof.

Figure 3:
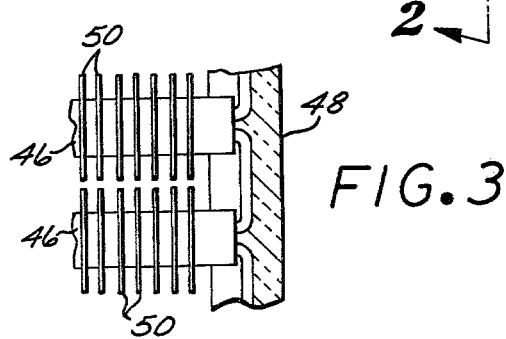
FIG. 3 is an enlarged detail view taken along the line 3—3 of FIG. 1.

As seen in FIGS. 2 and 3, the vertical run 42 is disposed through the insulating material of the block 36. Similarly, the short vertical runs connecting the runs 44 are disposed within end panels 48 made of heat insulating material and overlying and covering the ends of the means 12 and 14, as seen in FIG. 1.

The upper portions of the panels 48 project rearwardly of the insulating block 36 and structurally support the ends of the plurality of heat storage containers 46. The containers 46 are arranged in vertically spaced apart relation and also in spaced relation to the upper block 36 to facilitate air circulation therein, as will be seen.

Each container 46 is liquid tight and is filled leaving volume for expansion, with a suitable phase change material (not shown) within which the horizontal condensor runs 44 are embedded in intimate heat exchange relation. Fins (not shown) may be employed to facilitate heat transfer. Heat transfer is thus directly from the runs 44 to the phase change material, and not via any intermediate medium such as air, thereby avoiding undesirably high temperatures in the condensor area. The phase change material is in a solid state below a predetermined working temperature, such as approximately 81° F., for example, whereby heated refrigerant in a vapor state in the condensor 40 will melt or liquify a portion of the phase change material without raising the temperature surrounding the storage containers 46 to an uncomfortable level. The stored heat is latent heat, and is released only when the working temperature of the surrounding environment drops to a temperature below the predetermined working temperature. A number of phase change materials suitable for this purpose are available on the market, one form being calcium chloride hexahydrate ($CaCl_2.6H_2O$) which is commercially available as "XFS-43076" from the Dow Chemical Company.

Each of the heat storage containers 46 preferably mounts a plurality of annular heat conducting fins 50 which are uniformly spaced apart along the length of each container.

Suitable louvers 52 may be mounted between the end panels 48 at the top, bottom and back of the condensor and storage means 14 to facilitate circulation of air past the containers 46 and fins 50 along the paths generally indicated in FIG. 2.

In operation the solar heater 10 is vertically arranged within the wall 16 or window opening 18 on the south side of the building. During daylight hours the sun's rays impinge upon the collector sheet 26 and develop solar heat in the cavity 28. The collected heat is transferred to the liquid refrigerant within the evaporator 34, resulting in vaporization of the refrigerant. The refrigerant vapor rises naturally within the vertical run 42 and passes into the condensor runs 44. The relatively hot refrigerant vapor condenses and transfers its heat to the solid phase change material within the containers 46. The condensed refrigerant flows by gravity back to the evaporator 34 to repeat the cycle.

A quantity of the phase change material liquifies, according to the degree of heat exchange, and this heat is retained as latent heat unless the air circulating past the heat exchange fins 50 is at a temperature below the predetermined working temperature, such as at night. When this occurs air circulating past the containers 46 and fins 50 warms the room air through natural convection, although a circulating fan (not shown) could be employed if desired. This continues until all of the phase change material has resolidified.

Excessive air heating during periods of complete melting or liquification of the phase change material can be avoided, if desired, by closing the louvers 52 or by employing a thermostatic valve (not shown) to block refrigerant circulation. System overpressure is avoided by virtue of the use of the low vapor pressure refrigerant previously mentioned, and by allowing sufficient volume within the storage containers 46 to accommodate phase change material expansion.

During the night, or whenever the outside temperature falls below the temperature existing in the cavity 28, refrigerant evaporation or vaporization ceases and the resulting liquid refrigerant flows into and fills the tubular evaporator 34. This blocks the flow of any refrigerant vapor through the condensor 40 and prevents heat from being transported from the condensor and storage means 14 to the collector and evaporator means 12 where it would undesirably be dissipated to the colder environment existing exteriorly of the evaporator 34. Instead, the latent heat stored in the phase change material within the containers 46 is conserved and continues to warm the house air by natural convection of the house air through the louvers 52, such warming continuing until all of the phase change material is again in a solid state. Conservation of heat is enhanced by the presence of the insulating material of the blocks 30, 36 and 38.

In a typical application, the solar heater is fully precharged with refrigerant and phase change material prior to installation. Proper sizing of the storage containers 46 and other heat transfer elements maintains the phase change material in a partially solid, partially liquid condition to provide a relatively constant temperature for heating of room air.

Figure 5:
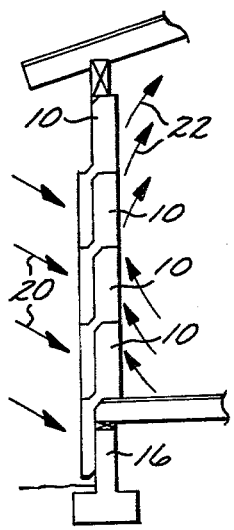
FIG. 5 is a generally diagrammatic side elevational view of a plurality of the solar heaters arranged in superposed, stacked relation.

The offset configuration of the means 12 and 14 allows stacking of identical heaters 10 in superposed relation, as seen in FIG. 5, whereby the heaters 10 can form part of the building wall. With this arrangement an air circulatiion fan (not shown) and suitable ducting (not shown) could be employed to more precisely control the flow of air past the storage containers 46.

From the foregoing it will be seen that there has been provided a self-contained solar heater 10 which can be precharged with refrigerant and phase change material for ready installation. It stores solar heat collected during the day and makes it available to heat the house during the evening or whenever interior air temperatures drop below a predetermined level. There is no need for any electrical power nor any need for adjustment of the heater under most conditions.

The collection of solar energy is efficient since the refrigerant is circulated only when temperature conditions are favorable for heat retention. Collected solar heat is transported through an insulation barrier for storage in the phase change material, and heat leakage back through that barrier is prevented. The collected solar heat is stored directly in the phase change material, without any intermediate and possibly excessive heating of house air in the condenser area. The thermal storage containers 46 are not exposed to direct sunlight and therefore need not be constructed of ultraviolet resistant materials. The modular shape of the heater 10 also allows stacking to efficiently utilize both exterior and interior wall spaces, and the heater can be adapted to fit standard window openings.

Various modifications and changes may be made with regard to the foregoing detailed description without departing from the spirit of the invention.

I claim:
1. A solar heater comprising:
    collector and evaporator means including a collector for exposure to the sun to collect solar heat, and further including a tubular evaporator in heat exchange relation to said collector and having liquid refrigerant therein adapted to be vaporized upon receipt of solar heat from said collector; and
    condensor and storage means located above said collector and evaporator means and including a tubular condensor in fluid communication with said evaporator for receiving vapor refrigerant rising naturally from said evaporator upon being heated by said solar heat, said condensor and storage means further including solid phase change material within which said condensor is embedded in heat exchange relation, said material being adapted to liquify at a predetermined working temperature upon receipt of heat from said condensor whereby said heat may be released to a surrounding environment colder than said working temperature during a phase change of said material from a liquid to a solid state, and whereby the cooled, liquid refrigerant is enabled to flow by gravity into said evaporator, said liquid refrigerant in said evaporator obstructing continued circulation of refrigerant through said condensor and said evaporator in the absence of collection of solar heat by said collector thereby to reduce heat loss through said evaporator during the night.

2. A solar heater according to claim 1 and including heat insulation upon the interiorly located side of said collector and evaporator means, and further including heat insulation upon the exteriorly located side of said condensor and storage means.

3. A solar heater according to claim 1 wherein said phase change material is included in a plurality of containers, and the tubing of said condensor extends through said containers, said containers being spaced apart whereby air may circulate naturally past said containers for heating the surrounding environment.

4. A solar heater according to claim 3 and including heat transfer fins upon the exteriors of said containers.

5. A solar heater according to claim 1 wherein said collector and evaporator means and said condensor and storage means constitute an integral, sealed unit rectangularly configured for installation in a building window opening, said condensor and storage means being adapted for engagement at its upper and lower termini by the structure defining the upper and lower margins of said window opening, said collector and evaporator means being outwardly offset from said condensor and storage means for location adjacent the building exterior below said window opening.

6. A solar heater according to claim 1 wherein said collector and evaporator means are outwardly offset relative to said condensor and storage means whereby a plurality of said solar heaters can be stacked in nested, superposed relation to form a part of a building wall, the interior sides of all the collector and evaporator means except the bottom solar heater resting, respectively, against the exterior sides of the condensor and storage means.

7. A solar heater according to claim 1 wherein the horizontally oriented rows of the tubing of said evaporator and said condensor are sloped to facilitate gravity flow of liquid refrigerant to said evaporator.

8. A solar heater according to claim 1 wherein the tubing of said evaporator is generally oriented in a first vertical plane, and the tubing of said condensor is generally oriented in a second vertical plane.

9. A solar heater according to claim 8 wherein said first and second vertical planes are vertically offset to facilitate vertical stacking and nesting of a plurality of said solar units.

10. A solar heater comprising:
    rectangularly configured collector and evaporator means for location below a building window opening adjacent the building exterior, and including a collector for exposure to the sun to collect solar heat, and further including a generally vertically disposed tubular evaporator in heat exchange relation to said collector and having liquid refrigerant therein adapted to be vaporized upon receipt of solar heat from said collector; and rectangularly configured condensor and storage means located above and interiorly offset relative to said collector and evaporator means to fit within said window opening, and including a generally vertically disposed tubular condensor in fluid communication with said evaporator for receiving vapor refrigerant rising naturally from said evaporator upon being heated by said solar heat, said condensor and storage means further including a plurality of spaced apart containers containing solid phase change material and through which said tubular condensor extends in heat exchange relation, said material being adapted to liquify at a predetermined working temperature upon receipt of heat from said condensor whereby, accompanied by a phase change of said material from a liquid to a solid state, said heat may be released to air colder than said working temperature and which is flowing past said containers, and whereby the cooled, liquid refrigerant is enabled to flow by gravity into said evaporator, said liquid refrigerant in said evaporator obstructing continued circulation of refrigerant through said condensor and said evaporator in the absence of collection of solar heat by said collector thereby to reduce heat loss through said evaporator during the night, the exteriorly facing portion of said condensor and storage means and the interiorly facing portion of said evaporator being insulated.

* * * * *